M. FRIED.
BAKY CARRIAGE.
APPLICATION FILED OCT. 8, 1910.
1,014,292.
Patented Jan. 9, 1912.
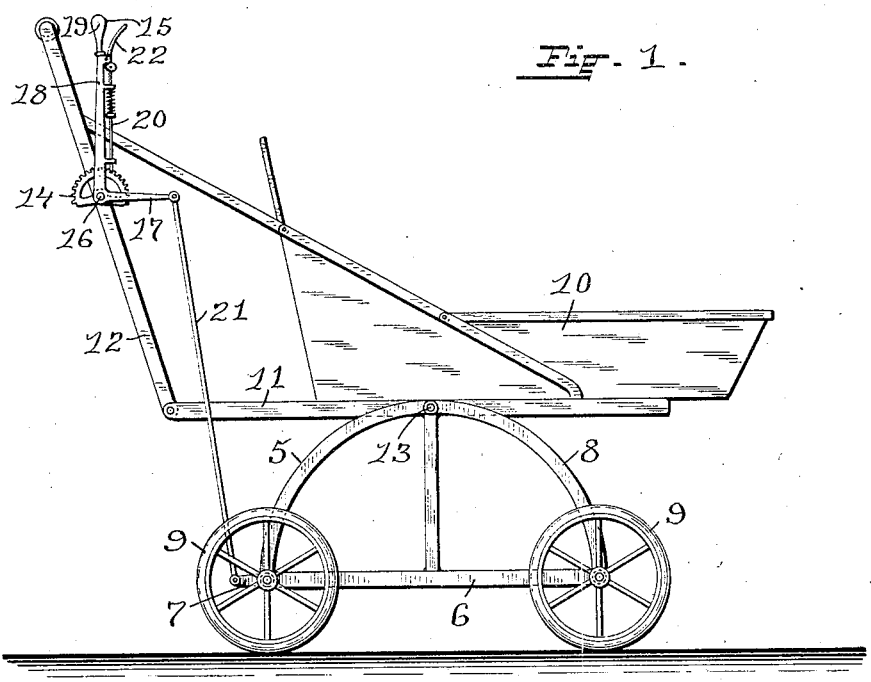
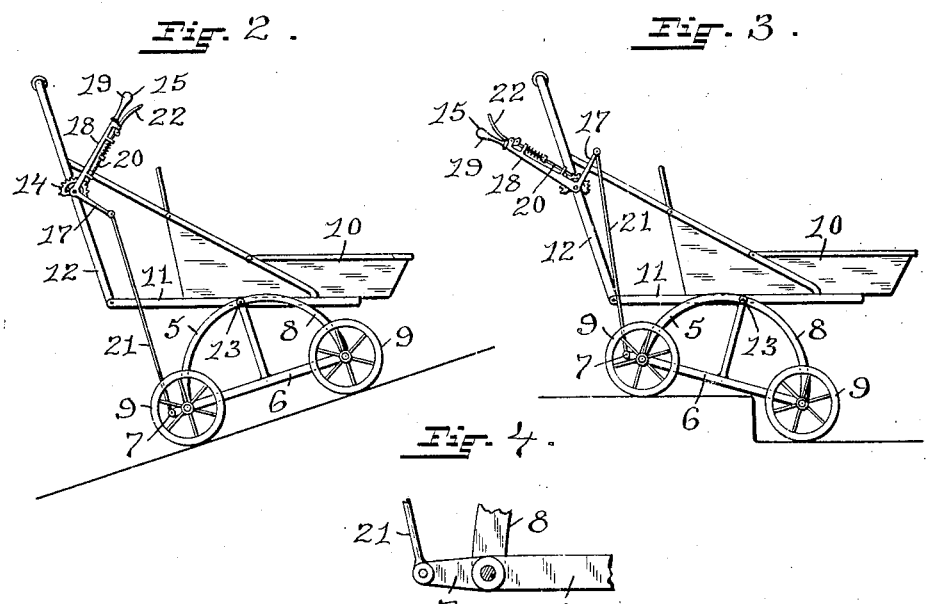
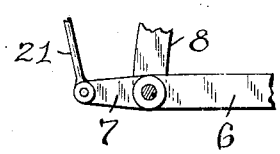
WITNESSES:
Amelia Lynch
Julia Ricci
INVENTOR:
Marcus Fried.
by Charles H. Luther
ATTORNEY.

UNITED STATES PATENT OFFICE.

MARCUS FRIED, OF PROVIDENCE, RHODE ISLAND.

BALY-CARRIAGE.

1,014,292.

Specification of Letters Patent.     Patented Jan. 9, 1912.

Application filed October 8, 1910. Serial No. 585,999.

*To all whom it may concern:*

Be it known that I, MARCUS FRIED, a subject of Austria-Hungary, residing at Providence, in the county of Providence and State of Rhode Island, have invented a new and useful Improvement in Baby-Carriages, of which the following is a specification.

This invention has reference to an improvement in hand propelled vehicles and more particularly to an improvement in baby carriages.

In baby carriages as heretofore constructed, the body of the carriage, as a whole, is in a practically fixed position relative to the running gear. In going down stairs, down hill or off a curbstone, the front of the body inclines downward and the baby or child slides down in the body toward the front of the carriage, also in going up a hill or curbstone the back of the body inclines downward and the baby or child slides down in the body toward the back of the carriage. This inclining or tilting of the carriage under these conditions, throws the baby or child into an uncomfortable position and usually wakes the baby and at a time when it is desired that the baby or child should be sleeping.

The object of my invention is to improve the construction of a baby carriage whereby when the running gear of the carriage inclines at an angle, as in going up or down hill, the body of the carriage may be adjusted to a horizontal or level position.

A further object of my invention is to construct a baby carriage so that the body of the carriage may be adjusted parallel with or at any angle required, relative to the running gear and held in the adjusted position.

My invention consists in the peculiar and novel construction of a baby carriage, said baby carriage having details of construction, as will be more fully set forth hereinafter and claimed.

Figure 1. is a side view of a baby carriage embodying my invention and showing the body and running gear on a level or horizontal plane. Fig. 2. is a side view of the baby carriage on a reduced scale, showing the body on a horizontal plane and the running gear at an upward angle, as in going up hill. Fig. 3. is a side view similar to Fig. 2. showing the body level or on a horizontal plane and the running-gear at a downward angle, as in going down stairs, and Fig. 4. is an enlarged detail view of a portion of the running gear frame and the lower end of the connecting rod.

In the drawings, 5. indicates the running-gear of my improved baby carriage which consists of a horizontal frame 6. having a rearwardly extending arm 7. on the side and preferably semi-circular upwardly extending sides 8. one only of which is shown. The four wheels 9, 9. two only of which are shown, are rotatably secured front and back to the frame 6. in any well known way. The body 10. has a lower frame 11. supporting the bottom or seat and an upwardly extending handle member 12. otherwise the body 10. may have the construction of any one of the well known forms of baby carriage body constructions. The frame 11. of the body 10. is pivotally secured to the running gear at 13. by bolts or other means, the pivot connections being preferably at the center line of the running gear and body, as shown in Fig. 1. A pivot member 14. in the form of a segmental gear, is secured to the handle member 12. and forms a pivot for a bell-crank lever 15. which is pivotally secured at 16. by a bolt or other means. The bell-crank lever 15. has a forwardly extending arm 17. and an upwardly extending arm 18. terminating in a handle 19. and carrying a spring actuated latch 20. which engages with the teeth on the pivot member 14. A connecting rod 21. is pivotally secured at its upper end to the end of the arm 17. and at its lower end to the rearwardly extending arm 7. on the running gear frame. The latch 20. has an operating finger 22. adjacent the handle 19. on the bell-crank lever 15. as shown in Fig. 1.

In the operation of my improved baby carriage, for going up hill, the handle 19. is grasped by the hand and the natural closing movement of the hand operates the finger 22. to release the latch 20. The handle 19. is then pushed forward and operates through the arms 18. and 17. the rod 21. and the arm 7. to raise the rear and lower the front of the carriage body 10. on the pivot at 13. until the body is brought to a horizontal line, when the finger 22. is released and the latch, engaging with the teeth on the member 14. locks the body 10. of the carriage in a level or horizontal position, as shown in Fig. 2. In going down stairs or down hill, the handle 19. is pulled rearwardly to bring the body 10. into the desired horizontal position, as shown in Fig. 3. and locked in the adjusted position. The whole body 10. may be adjusted for any intermediate position to bring the same to a level or horizontal plane, on any up or down grade, on which the carriage would or could be used.

It is evident that the construction of my improved baby carriage could be varied for the purpose specified, without materially affecting the spirit of my invention.

Having thus described my invention I claim as new and desire to secure by Letters Patent:—

1. In a baby carriage and the like, a running-gear comprising a frame, upwardly extending semi-circular sides on the frame, a rearwardly extending arm on the frame, wheels rotatably secured to the frame, a body pivotally secured to the semi-circular sides of the running-gear frame and adapted to hold an infant or child, a handle member on the body, a bell-crank lever pivotally secured to the handle member, means for operatively connecting the bell-crank lever with the arm on the running-gear frame and means for adjustably securing the bell-crank lever to the handle member, whereby the body may be adjusted parallel with or at any desired angle relative to the running-gear and locked in the adjusted position.

2. A baby carriage, comprising a running-gear, upwardly extending side members on the running-gear, a rearwardly extending arm on the running-gear, a baby carriage body pivotally secured to the side members on the running-gear whereby the whole baby carriage body may be adjusted to a horizontal position in going up or down hill, a handle member on the body, a bell-crank lever pivotally secured to the handle member, a rod connecting the bell-crank lever with the rearwardly extending arm on the running-gear and means for adjustably securing the bell-crank lever to the handle member.

3. A baby carriage, comprising a running-gear 5. having a rearwardly extending arm 7. and upwardly extending sides 8. a baby carriage body 10. pivotally secured to the upwardly extending sides 8., and having an upwardly extending handle member 12, a pivot member 14. in the form of a segmental gear secured to the handle member 12, a bell-crank lever 15. pivotally secured to the pivot member 14. and having a forwardly extending arm 17. and an upwardly extending arm 18. terminating in a handle 19. and carrying a spring actuated latch 20, which engages with the teeth on the pivot member 14, and a connecting rod 21. pivotally secured at its upper end to the end of the arm 17. and at its lower end to the rearwardly extending arm 7. on the running-gear.

In testimony whereof I have signed my name to this specification in the presence of two subscribing witnesses.

MARCUS FRIED.

Witnesses:
  WILLIAM C. H. BRAND,
  CHAS. H. LUTHER.